E. E. WICKERSHAM.
TRACTOR FRAME SUSPENSION.
APPLICATION FILED SEPT. 29, 1919.
1,429,473.
Patented Sept. 19, 1922.
2 SHEETS—SHEET 1.
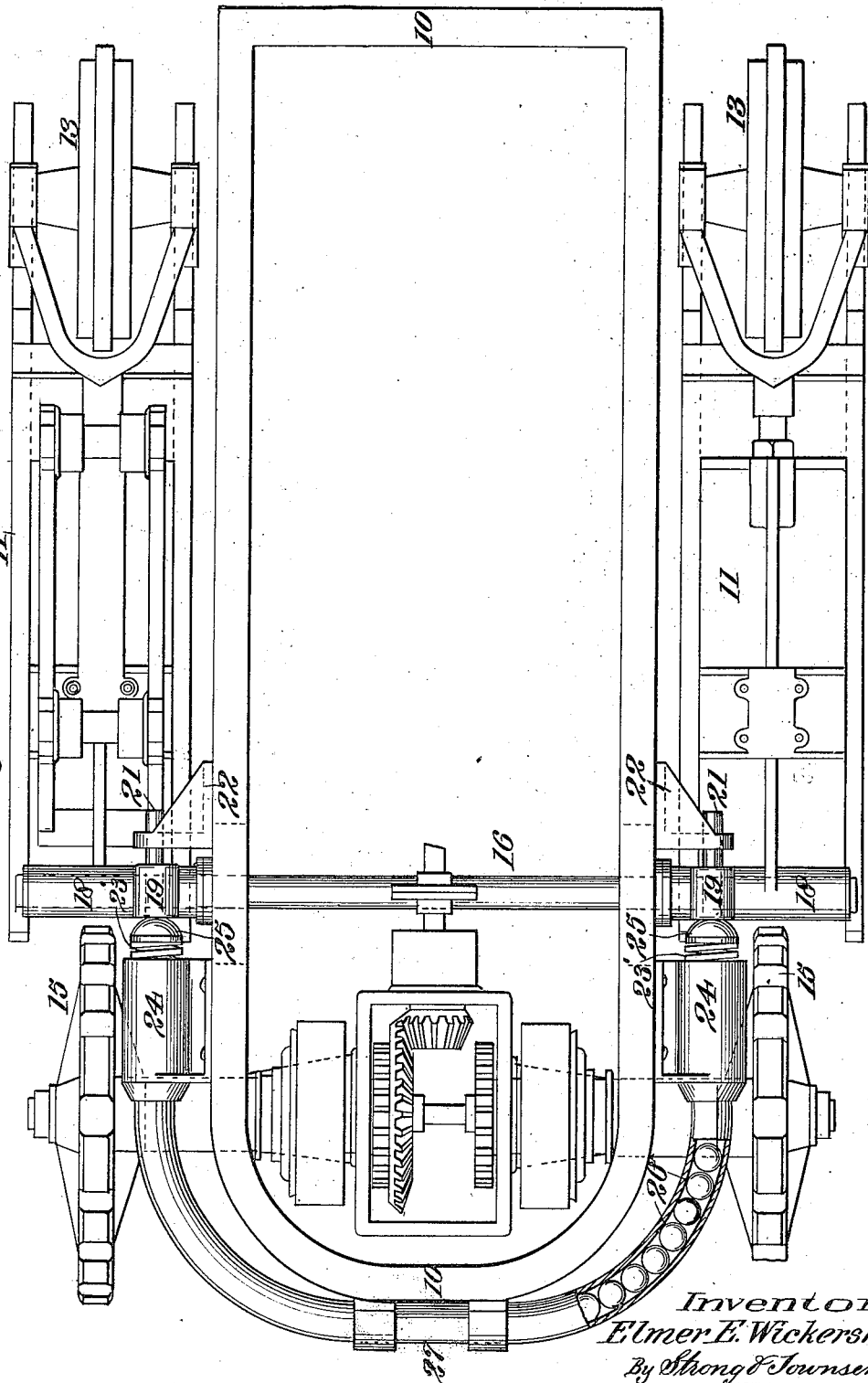
Inventor
Elmer E. Wickersham
By Strong & Townsend
ATTORNEYS

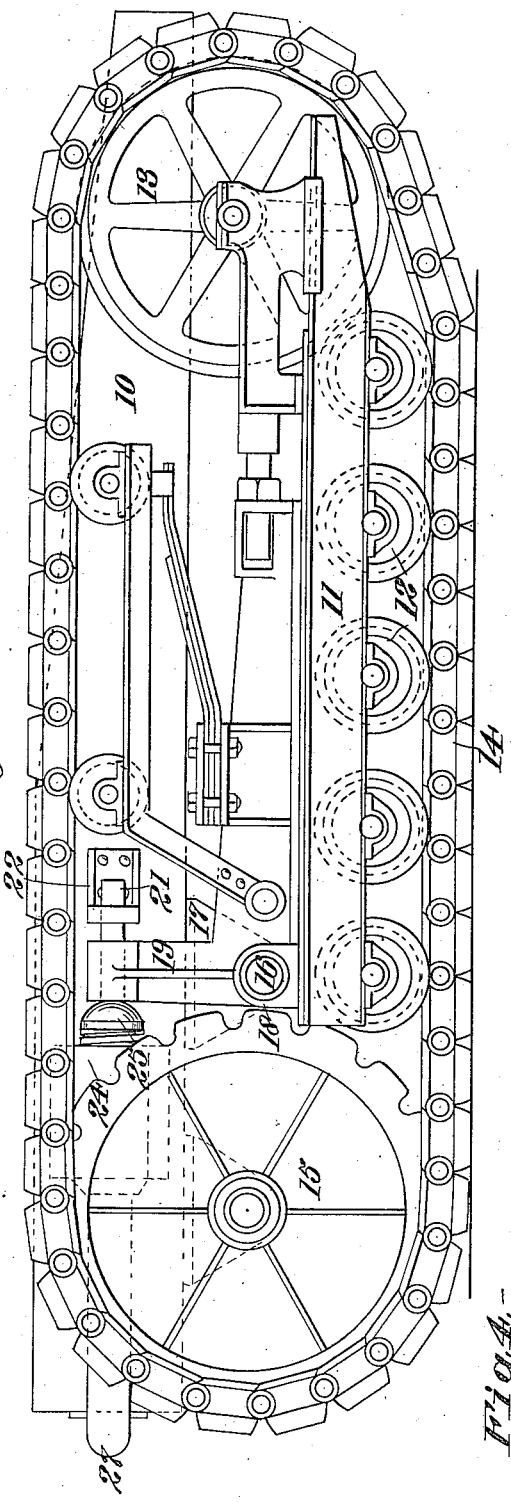
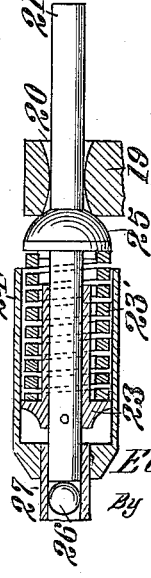
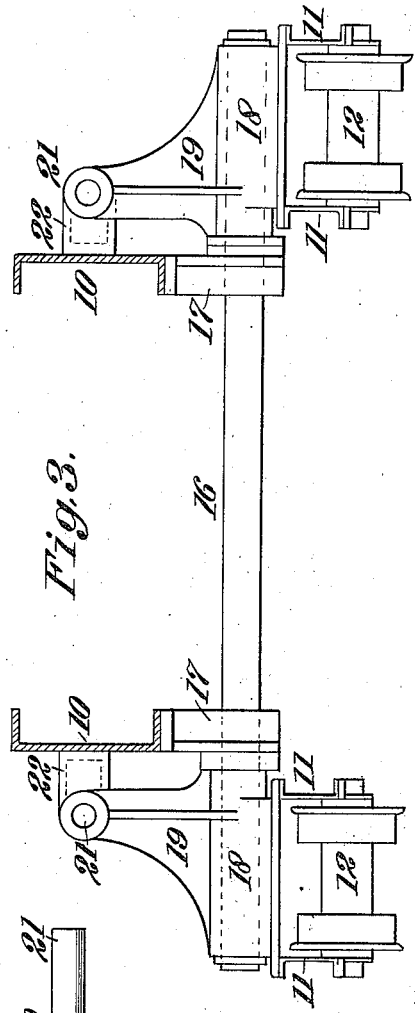

Patented Sept. 19, 1922.

1,429,473

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR-FRAME SUSPENSION.

Application filed September 29, 1919. Serial No. 327,283.

*To all whom it may concern:*

Be it known that I, ELMER E. WICKERSHAM, a citizen of the United States, residing at Stockton, in the county of San Joaquin and State of California, have invented new and useful Improvements in Tractor-Frame Suspensions, of which the following is a specification.

This invention relates to tractors of the chain track type, and more particularly to means for supporting the main frame upon the truck mechanisms.

In my prior application, Serial No. 314,205, filed July 30th 1919, I show and describe means for suspending the entire weight of the main frame at a single point upon each of the truck mechanisms. The present invention contemplates a specifically different form of suspension of this general type wherein there has been a simplification and improvement of the mechanism throughout.

Referring to the accompanying drawings:

Fig. 1 shows a plan view of a tractor embodying my invention.

Fig. 2 shows a side elevation of the same.

Fig. 3 shows a sectional view taken at the rear of the truck mechanisms.

Fig. 4 shows a detail sectional view of one of the stabilizing springs.

As herein shown, the tractor comprises a main frame 10 at each side of which is arranged a self-laying track truck mechanism comprising a truck frame 11 on which is journaled a series of rollers 12, at the forward end of which is journaled an idler sprocket wheel 13. An endless chain track 14 is carried at its forward run upon the idler wheel 13 and passes beneath the rollers 12 forming a track for the latter. A sprocket driving wheel 15 is journaled on the main frame at the rear of the truck frame 11 and serves to carry and drive the chain track 14. The entire weight of the main frame is supported at a single point on each of the truck frames 11 by means of a transverse supporting axle 16 fixed in hangers 17 on the main frame and having outwardly extending ends passing through bearings 18 formed on the truck frames. Each truck frame is free to rock about the axle 16 and the main frame is stabilized by means of an upwardly extending bracket 19 formed on each of the bearings 18, said bracket 19 having an opening 20 in its upper end through which passes a thrust rod 21.

This thrust rod is guided at its forward end by a bracket 22 fixed to the main frame and at its rearward end it is provided with a cross-head 23 against which a pressure spring 23' abuts. This pressure spring 23' is carried in a housing 24 fixed to the main frame. A thrust washer 25, slidable on the rod 21, is interposed between the pressure spring and the upper end of the bracket 19. The rear end of the thrust rod 21 abuts against a series of balls 26, said balls being carried in a curved race 27, which race is secured to the rear end of the main frame and forms a connection between the thrust rods at opposite sides of the main frame.

In the operation of the tractor it will be seen that the entire weight of the main frame is supported by the axle 16 at a single point on each of the truck frames 11. The location of the axle 16 is to the rear of the center of weight of the main frame and the main frame is prevented tilting downwardly at its forward end independent of the truck frames by the pressure of the springs 23' against the upwardly extending brackets 19. Each truck frame is free to rock about the axle 16, and, should one of these truck mechanisms meet with an obstruction in the roadway, its forward end will move upwardly, causing the upwardly extending bracket 19 to rock rearwardly and exert a pressure on the adjacent spring 23'. The pressure of this spring will force the connected thrust rod 21 rearwardly and the movement of this thrust rod 21 will act through the interposed balls 26 to compress the opposite spring 23'. Thereby the compression of opposite springs 23' is equalized and a rising movement of the forward end of one truck mechanism will impart a force to the opposite truck mechanism which will tend to move the forward end of the latter downwardly.

The main frame is prevented from tilting downwardly at its rear end by reason of the fact that the center of weight of the main frame is forward of the support 16. In extreme cases, as in climbing a steep grade, where a preponderance of weight might possibly be threatened upon the rear end, the standard or bracket 19 will prevent any radical downward movement of the rear end of the main frame. Thus it will be seen that the driving sprocket wheel 15 is not a load-supporting member and, so far as the suspension of the main frame is concerned, it might be removed entirely.

Having thus described my invention, what I claim and desire to secure by Letters Patent is:

1. In a vehicle, a main frame, a chain track truck mechanism at each side thereof mounted for rocking movement in a vertical plane and equalizing connections between the main frame and opposite truck mechanisms comprising a ball race fixed upon the main frame, a series of balls in said race extending from one side to the other of the main frame and brackets on each truck mechanism co-operating with the balls in said race to cause opposite and equal movements of the truck mechanisms.

2. In a vehicle, a main frame, a chain track truck mechanism at each side thereof, an axle on the main frame at the rear of the center of weight thereof, a bearing for each end of the axle on the opposite truck mechanisms, an upwardly extending bracket formed on each of the bearings, a spring pressing against each of the brackets at the upper ends of the latter and connected with the main frame for stabilizing the latter, and a connection between opposite springs to equalize the pressure of the latter.

3. In a vehicle, a main frame, a chain track truck mechanism at each side thereof, an axle on the main frame at the rear of the center of weight thereof, a bearing for each end of the axle on the opposite truck mechanisms, an upwardly extending bracket formed on each of the bearings, a spring pressing against each of the brackets at the upper ends of the latter and connected with the main frame for stabilizing the latter, a connection between opposite springs to equalize the pressure of the latter, said connection comprising a series of balls arranged between the opposite springs and a race for said balls fixed to the main frame.

In testimony whereof I have hereunto set my hand in the presence of two subscribing witnesses.

ELMER E. WICKERSHAM.

Witnesses:
W. W. HEALEY,
J. H. HERRING.